C. J. BOUSFIELD.
TALKING MACHINE CABINET.
APPLICATION FILED FEB. 12, 1917.
1,291,741.
Patented Jan. 21, 1919.
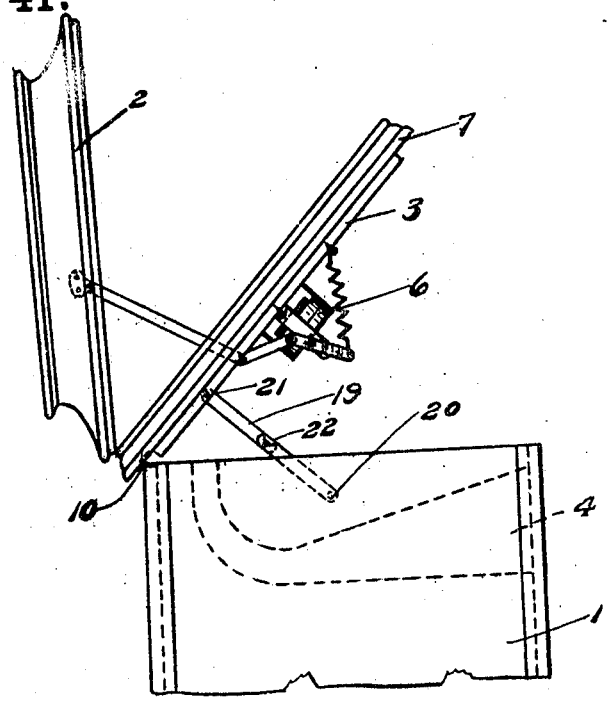
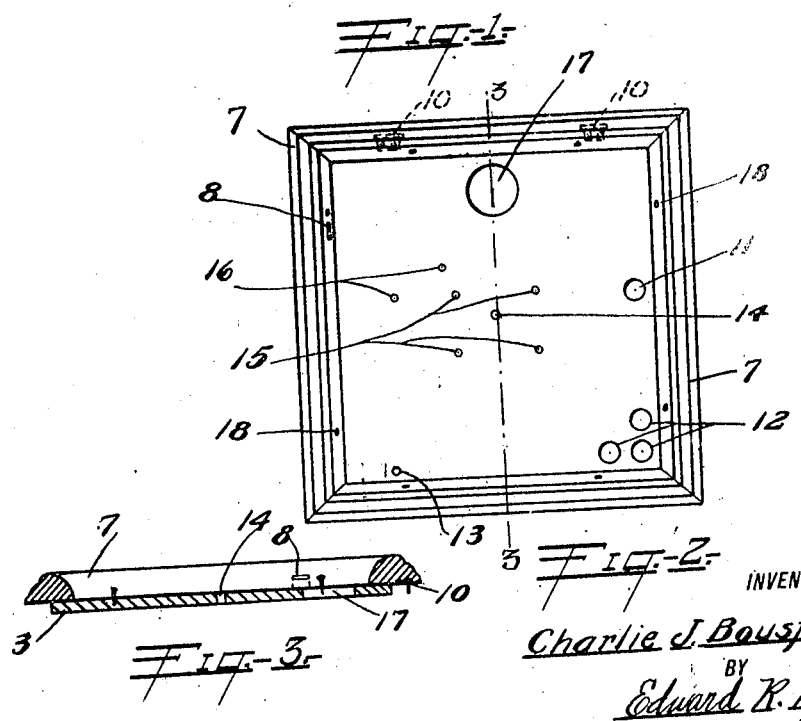
INVENTOR
Charlie J. Bousfield
BY
Edward R. Monroe
ATTORNEY

UNITED STATES PATENT OFFICE.

CHARLIE J. BOUSFIELD, OF BAY CITY, MICHIGAN, ASSIGNOR TO DELPHEON COMPANY, OF BAY CITY, MICHIGAN, A CORPORATION OF MICHIGAN.

TALKING-MACHINE CABINET.

1,291,741.

Specification of Letters Patent.

Patented Jan. 21, 1919.

Application filed February 12, 1917. Serial No. 148,182.

*To all whom it may concern:*

Be it known that I, CHARLIE J. BOUSFIELD, a citizen of the United States of America, residing at Bay City, in the county of Bay and State of Michigan, have invented certain new and useful Improvements in Talking-Machine Cabinets, of which the following is a specification.

This invention relates to improvements in talking machine cabinets.

One object of my invention is to provide a one piece motor board upon which all of the operative mechanism of a talking machine may be attached.

Another object resides in the provision of means whereby the motor board and the cover of the cabinet may be swung upward and backward as a unit, exposing all mechanism to view and in a position where it can be readily repaired, adjusted and tested.

With the above and other objects in view, the present invention consists in the combination and arrangement of parts hereinafter more fully described, illustrated in the accompanying drawings, and particularly pointed out in the appended claims, it being understood that changes may be made in the form, size, proportion and minor details without departing from the spirit or sacrificing any of the advantages of the invention.

In the drawings:

Figure 1 is a side elevation of a talking machine cabinet showing the motor board and cover in the raised position.

Fig. 2 is a plan of the motor board, and

Fig. 3 is a section taken on the line 3—3 of Fig. 2.

In the drawing, 1 indicates the ordinary talking machine cabinet, within which is housed the tone horn 4, the motor board 3 and the cover 2 being hinged thereto by means of the hinges 10 which are secured to the top of the cabinet 1 and the underside of the molding frame 7 which forms a part of, and is secured to the motor board 3 by the screws 18. This molding frame 7 which rests on the upper edge of the cabinet 1 and which supports the various devices which are adapted to be carried by, and suspended from the motor board 3, can be of any desired shape or design, but I prefer to construct it as shown, with the inner edge rounded to facilitate the removal of dust or other foreign matter from the surface of the motor board.

The motor board which is made of one solid piece is drilled before assembling to receive the various parts as is clearly shown in Fig. 2, the opening 17 being to accommodate the tone arm; the opening 14 is to allow the passage of the shaft upon which the turntable is adapted to set, while the motor 6 is suspended from the motor board by means of screws passing through the several openings 15, the various needle cups set in the openings 11 and 12; the opening 13 is to allow the attachment of the speed regulator, and the openings 16 are for the automatic stop, the raising arm of the cover support being adapted to pass through the slot 8 in the molding frame 7. Thus it will be obvious that all of the operative mechanism is carried by or suspended from the motor board 3.

In order that the motor board may be held in the position as shown in Fig. 1, I provide a common elbow hinge 19 which is pivoted to the cabinet at the point 20 and to the motor board at the point 21, its movement being limited by the stop 22, therefore when it is desired to inspect, adjust or repair any of the various devices, it is merely necessary to lift the motor board to the position shown, where it is held against further movement by the hinge 19.

Heretofore it has been customary to split the motor board in two pieces, or cut a square from the center thereof, from which is suspended the motor, with either of these methods of construction, it is necessary, (when making repairs or adjusting) to remove screws or bolts, and take the various parts therefrom separately, adjusting or repairing same and placing them again in the cabinet for testing. With my improved construction every part is carried by or suspended from the motor board as a unit, which when lifted, exposes every part to view, where it can be readily repaired, adjusted and tested without removing them from their respective positions.

What I claim is:—

1. In a talking machine and in combination with a cabinet, a motor board hinged to the top of the cabinet and projecting outwardly beyond all of the walls thereof, and seated upon the said walls, said motor board having a cover receiving seat, a cover hinged to the motor board and fitting the seat thereof, means for connecting the cover with the motor board for supporting the cover in an elevated position and separate independently operable means for connecting the motor board with the cabinet for supporting the motor board in a raised position, said supporting means being operable either simultaneously or independently.

2. In a talking machine and in combination with a cabinet, a motor board projecting outwardly beyond all of the walls of the cabinet and seated upon the same, said motor board being hinged to the cabinet and provided with a marginal molding frame forming a cover receiving seat, a cover hinged to the molding frame and fitting the said seat, means for connecting the cover with the motor board for supporting the cover in an elevated position and separate means for connecting the motor board with the cabinet for supporting the motor board in an elevated position, said supporting means being operable independently and simultaneously.

In testimony whereof I affix my signature.

CHARLIE J. BOUSFIELD.